United States Patent
Feuerstack et al.

(10) Patent No.: US 9,413,046 B2
(45) Date of Patent: Aug. 9, 2016

(54) METHOD FOR HEATING ENERGY STORAGE CELLS OF AN ENERGY STORAGE SYSTEM, AND HEATABLE ENERGY STORAGE SYSTEM

(71) Applicants: Robert Bosch GmbH, Stuttgart (DE); Samsung SDI Co., Ltd., Yongin-si, Gyeonggi-do (KR)

(72) Inventors: Peter Feuerstack, Ludwigsburg (DE); Hans Partes, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 14/387,181

(22) PCT Filed: Mar. 13, 2013

(86) PCT No.: PCT/EP2013/055143
§ 371 (c)(1),
(2) Date: Sep. 22, 2014

(87) PCT Pub. No.: WO2013/143853
PCT Pub. Date: Oct. 3, 2013

(65) Prior Publication Data
US 2015/0044520 A1     Feb. 12, 2015

(30) Foreign Application Priority Data
Mar. 29, 2012   (DE) .......................... 10 2012 205 119

(51) Int. Cl.
*H02J 7/04*     (2006.01)
*H02J 7/16*     (2006.01)
(Continued)

(52) U.S. Cl.
CPC ....... *H01M 10/5034* (2013.01); *B60L 11/1853* (2013.01); *B60L 11/1864* (2013.01);
(Continued)

(58) Field of Classification Search
CPC ........................................................ Y02E 60/12
USPC ............................................................ 320/162
See application file for complete search history.

(56) References Cited

U.S. PATENT DOCUMENTS

| 2,710,936 A | 6/1955 | Lowry et al. |
| 5,642,275 A | 6/1997 | Peng et al. |

(Continued)

FOREIGN PATENT DOCUMENTS

| DE | 10 2009 003 180 A1 | 11/2010 |
| DE | 10 2010 027 857 A1 | 10/2011 |

(Continued)

OTHER PUBLICATIONS

International Search Report corresponding to PCT Application No. PCT/EP2013/055143, mailed Jul. 4, 2013 (German and English language document) (5 pages).

*Primary Examiner* — Suresh Memula
(74) *Attorney, Agent, or Firm* — Maginot, Moore & Beck LLP

(57) ABSTRACT

A method for heating energy storage cells of an energy storage system configured to generate an n-phase supply voltage. The energy storage system including n energy supply branches connected in parallel. Each energy supply branch coupled between an output connection and an equipotential frame, and each of the energy supply branches including a plurality of series-connected energy storage modules. Each energy storage module including an energy storage cell module having at least one energy storage cell and a coupling device having coupling elements configured to selectively connect or bridge the energy storage cell module in a respective energy supply branch. The method includes connecting the output connections of the energy storage system to input connections of an n-phase electrical machine, and coupling the output connections via a neutral point of the electrical machine.

10 Claims, 2 Drawing Sheets

(51) Int. Cl.
  *H01M 10/65*   (2014.01)
  *H01M 10/0525*  (2010.01)
  *H01M 10/42*   (2006.01)
  *B60L 11/18*   (2006.01)
  *H01M 10/625*  (2014.01)
  *H01M 10/615*  (2014.01)
  *H01M 10/637*  (2014.01)

(52) U.S. Cl.
  CPC ....... *B60L11/1875* (2013.01); *H01M 10/0525* (2013.01); *H01M 10/425* (2013.01); *H01M 10/615* (2015.04); *H01M 10/625* (2015.04); *H01M 10/637* (2015.04); *H01M 10/65* (2015.04); *B60L 2210/30* (2013.01); *B60L 2220/12* (2013.01); *B60L 2220/54* (2013.01); *B60L 2240/545* (2013.01); *B60L 2240/80* (2013.01); *H01M 2220/20* (2013.01); *Y02E 60/122* (2013.01); *Y02T 10/641* (2013.01); *Y02T 10/7005* (2013.01); *Y02T 10/7011* (2013.01); *Y02T 10/7061* (2013.01); *Y02T 10/7241* (2013.01)

(56) References Cited

U.S. PATENT DOCUMENTS

| | | | | |
|---|---|---|---|---|
| 2011/0068738 | A1* | 3/2011 | Gomi | B62J 1/005 |
| | | | | 320/108 |
| 2011/0273136 | A1* | 11/2011 | Yoshimoto | H02M 1/10 |
| | | | | 320/103 |
| 2013/0049703 | A1* | 2/2013 | Perisic | H01M 10/44 |
| | | | | 320/162 |

FOREIGN PATENT DOCUMENTS

| | | |
|---|---|---|
| DE | 10 2010 027 861 A1 | 10/2011 |
| JP | 2003-32901 A | 1/2003 |
| JP | 2005-278266 A | 10/2005 |

* cited by examiner

METHOD FOR HEATING ENERGY STORAGE CELLS OF AN ENERGY STORAGE SYSTEM, AND HEATABLE ENERGY STORAGE SYSTEM

This application is a 35 U.S.C. §371 National Stage Application of PCT/EP2013/055143, filed on Mar. 13, 2013, which claims the benefit of priority to Serial No. DE 10 2012 205 119.8, filed on Mar. 29, 2012 in Germany, the disclosures of which are incorporated herein by reference in their entirety.

The disclosure relates to a method for heating energy storage cells of an energy storage device and to a heatable energy storage device, in particular an energy storage device with modular battery system for an electrically driven vehicle.

BACKGROUND

The trend is that, in the future, electronic systems that combine new energy storage technologies with electrical drive technology will be used increasingly both in stationary applications, such as wind power installations or solar installations, and in vehicles, such as hybrid or electric vehicles.

The supply of polyphase current to an electric machine is usually accomplished by a converter in the form of a pulse-controlled inverter. For this purpose, a DC voltage provided by a DC voltage intermediate circuit can be converted into a polyphase AC voltage, for example a three-phase AC voltage. In this case, the DC voltage intermediate circuit is powered by a string of battery modules connected up in series. In order to be able to meet the demands on power and energy for a respective application, a plurality of battery modules are frequently connected in series in a traction battery.

A series circuit comprising a plurality of battery modules is associated with the problem that the entire string fails when a single battery module fails. Such a failure of the energy supply string can result in failure of the entire system. Furthermore, temporarily or permanently occurring power reductions of a single battery module can result in power reductions in the entire energy supply string.

The document U.S. Pat. No. 5,642,275 A1 describes a battery system with an integrated inverter function. Systems of this kind are known by the name of multilevel cascaded inverter or else battery direct inverter (BDI). Such systems comprise DC sources in a plurality of energy storage module strings that can be connected directly to an electric machine or an electric grid. In this case, single-phase or polyphase supply voltages can be generated. The energy storage module strings in this case have a plurality of series-connected energy storage modules, wherein each energy storage module has at least one battery cell and an associated controllable coupling unit which allows the respective energy storage module string to be interrupted or the respectively associated at least one battery cell to be bypassed or the respectively associated at least one battery cell to be switched into the respective energy storage module string, depending on control signals. By suitable actuation of the coupling units, for example using pulse-width modulation, suitable phase signals can also be provided for controlling the phase output voltage, as a result of which it is possible to dispense with a separate pulse-controlled inverter. The pulse-controlled inverter required for controlling the phase output voltage is therefore integrated in the BDI so to speak.

BDIs usually have a higher level of efficiency and a higher level of failsafety in comparison with conventional systems. Failsafety is ensured, inter alia, by the ability for faulty, failed or not fully effective battery cells to be disconnected from the energy supply strings by virtue of suitable bypass actuation of the coupling units. The phase output voltage of an energy storage module string can be varied, and, in particular, set in a stepped manner, by virtue of appropriate actuation of the coupling units. In this case, the step range of the output voltage is obtained from the voltage of a single energy storage module, with the maximum possible phase output voltage being determined by the sum of the voltages of all the energy storage modules in an energy storage module string.

By way of example, documents DE 10 2010 027 857 A1 and DE 10 2010 027 861 A1 disclose battery direct inverters having a plurality of battery module strings which are directly connectable to an electric machine.

In this case, the energy storage module strings have a plurality of series-connected energy storage modules, wherein each energy storage module has at least one battery cell and an associated controllable coupling unit which makes it possible to bypass the respectively associated at least one battery cell or to switch the respectively associated at least one battery cell into the respective energy storage module string, depending on control signals. Optionally, the coupling unit can be configured such that it additionally allows the respectively associated at least one battery cell also to be switched into the respective energy storage module string with reversed polarity or allows the respective energy storage module string to be interrupted.

BDIs usually have a higher level of efficiency and a higher level of failsafety in comparison with conventional systems. Failsafety is ensured, inter alia, by the ability for faulty, failed or not fully effective battery cells to be disconnected from the respective energy supply string by virtue of suitable bypass actuation of the coupling units. The total output voltage of each energy storage module string can be varied, and, in particular, set in a stepped manner, by virtue of appropriate actuation of the coupling units. In this case, the step range of the output voltage is obtained from the voltage of a single energy storage module, with the maximum possible total output voltage being determined by the sum of the voltages of all the energy storage modules in the energy storage module string.

In order to set an output voltage of an energy storage module, the coupling units are actuated in a pulse-width-modulated (PWM) manner. As a result, it is possible to output a desired average value as energy storage module voltage by targeted variation of the switch-on and switch-off times.

When used in electrically driven vehicles, such as electric cars or hybrid vehicles, for example, it is possible for the temperatures of the battery cells of energy storage devices of this type to be very low, for example during starting of the vehicle in winter. Since battery cells which are usually used have a temperature-dependent internal resistance which increases with decreasing temperature, it is possible that the battery cells cannot provide the full power in low temperatures.

There is therefore a need for a method which can ensure the full effectiveness of the battery cells, even at low temperatures, without elaborate heating elements or a time- and cost-intensive external heating process having to be used.

SUMMARY

According to one aspect, the present disclosure provides a method for heating energy storage cells of an energy storage device, which is configured to generate an n-phase supply voltage, wherein n≥1, and which has n parallel-connected energy supply branches which are in each case coupled between an output connection and a reference potential rail. In this case, each of the energy supply branches has a multiplicity of series-connected energy storage modules, which in each case comprise an energy storage cell module which has at least one energy storage cell, and a coupling device with coupling elements which are configured to selectively switch the energy storage cell module into the respective energy supply branch or to bypass it. The method has the steps of connecting the output connections of the energy storage device to input connections of an n-phase electric machine and coupling the output connections via the neutral point of the electric machine, actuating the coupling devices of at least one energy storage module of a first energy supply branch to switch the respective energy storage cell modules into the first energy supply branch, and, at the same time, actuating the coupling devices of at least one energy storage module of a second energy supply branch to switch the respective energy storage cell modules into the second energy supply branch for a first predetermined time period.

According to another aspect, the present disclosure provides a system, having an n-phase electric machine, wherein n≥1, an energy storage device, which is configured to generate an n-phase supply voltage, and which has n parallel-connected energy supply branches which are in each case coupled between an output connection and a reference potential rail, wherein each of the energy supply branches has a multiplicity of series-connected energy storage modules. The energy storage modules in each case comprise an energy storage cell module which has at least one energy storage cell, and a coupling device with coupling elements which are configured to selectively switch the energy storage cell module into the respective energy supply branch or to bypass it. The system also comprises n phase lines, which in each case couple one of the output connections of the energy storage device to in each case one of n phase connections of the n-phase electric machine, and a control device, which is configured to perform a method according to the disclosure.

The concept of the present disclosure is to heat an energy storage device, which is constructed in a modular fashion and has battery cells connected up in series in a plurality of energy supply branches, by high-frequency alternating transfer of electrical energy from one energy supply branch into another energy supply branch. This strategy makes use of the discovery that, by virtue of the transfer of electrical energy from one energy supply branch into another energy supply branch, heat loss occurs owing to the power loss when feeding the energy storage cells, it being possible for said heat loss to locally heat the energy storage cells.

This has the advantage that the energy storage cells, which have an undesirably high internal resistance at low temperatures, can be brought back to an operating temperature, at which the energy storage cells have full or almost full effectiveness, without additional heating measures or heating components.

It is also advantageously possible to supplement this actuation strategy with an actuation strategy necessary for the usual operation of the energy storage device, with the result that it is also possible to heat the energy storage cells during normal operation of the energy storage device. The redistribution of charge in the energy storage cells at a sufficiently high clock frequency offers the advantage that no undesired torques occur in the electric machine owing to the heating current.

According to an embodiment of the method according to the disclosure, the coupling devices of the at least one energy storage module of the second energy supply branch are also actuated to bypass the respective energy storage cell modules in the second energy supply branch for a second predetermined time period, after the first predetermined time period has elapsed. As a result, it is possible to avoid undesired torques occurring in the electric machine.

According to another embodiment of the method according to the disclosure, the first predetermined time period is shorter than the quotient of inductance and nonreactive resistance of the inductive components of the electric machine. This involves the advantage that the electrical energy can be intermediately stored in the inductive components of the electric machine, said inductive components being supplied by the energy storage modules of the first energy supply branch, and from said inductive components, the energy can be fed back into the energy storage modules of the second energy supply branch.

According to another embodiment of the method according to the disclosure, the at least one energy storage module of the first energy supply branch and the at least one energy storage module of the second energy supply branch are also selected to provide the n-phase supply voltage for the electric machine. This has the advantage that, in operating situations in which only a low input voltage is required for the electric machine, only some of the energy storage modules must be heated. Said heated energy storage modules can then be used in such operating situations, for example when starting an electrically driven vehicle, to provide the supply voltage, while the remaining energy storage modules which have not yet been heated only need to be heated later.

According to another embodiment of the method according to the disclosure, the method is performed if the temperature of the energy storage cells falls below a first predetermined limit value. Said procedure is particularly preferable at low temperatures at which the internal resistance of the energy storage cells is particularly high.

According to another embodiment of the method according to the disclosure, the steps of actuating the coupling devices of the at least one energy storage module of the second energy supply branch to switch the respective energy storage cell modules into the second energy supply branch and of actuating the coupling devices of the at least one energy storage module of the second energy supply branch to bypass the respective energy storage cell modules in the second energy supply branch occur in an alternating manner until the temperature of the energy storage cells of the energy storage modules in question exceeds a second predetermined limit value. Owing to said high-frequency transfer of electrical energy between the energy storage modules, heat can be generated by the power losses which occur, until the internal resistance of the energy storage cells is sufficiently low again.

According to an embodiment of the system according to the disclosure, the coupling devices can comprise coupling elements in a full-bridge circuit.

Alternatively, the coupling devices can comprise coupling elements in a half-bridge circuit.

According to another embodiment of the system according to the disclosure, the energy storage cells can comprise lithium-ion rechargeable batteries. This type of energy storage cells is particularly affected by increased internal resistance at low temperatures.

Further features and advantages of embodiments of the disclosure emerge from the following description with reference to the appended drawings.

DETAILED DESCRIPTION

Figure 1:
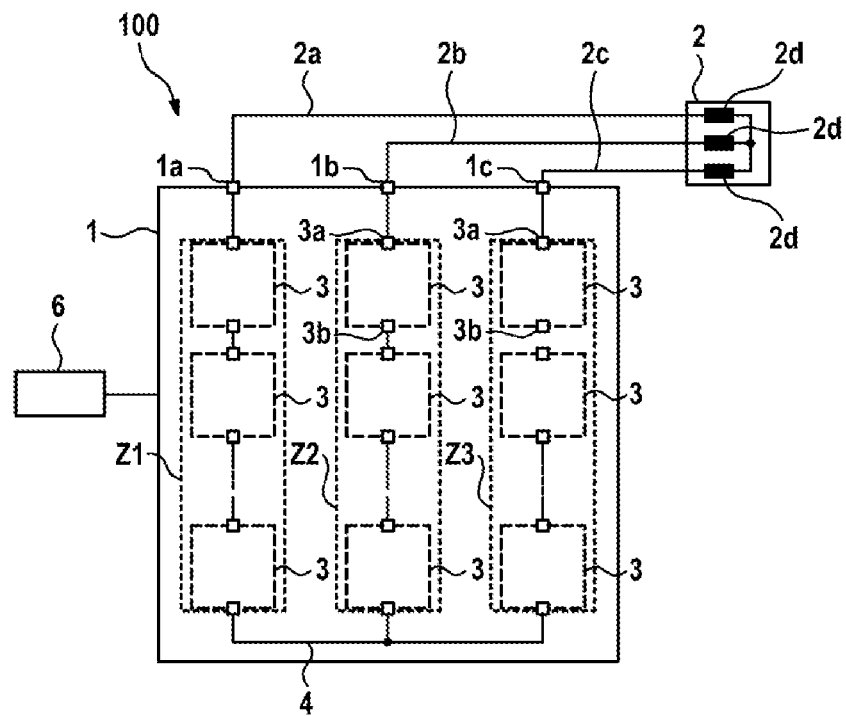
FIG. 1 shows a schematic illustration of a system having an energy storage device according to an embodiment of the present disclosure.

FIG. 1 shows a system 100 for voltage conversion of DC voltage provided by energy storage modules 3 into an n-phase AC voltage. The system 100 comprises an energy storage device 1 having energy storage modules 3, which are connected in series in energy supply branches. By way of example, FIG. 1 shows three energy supply branches Z1, Z2 and Z3, which are suitable for generating a three-phase AC voltage, for example for a three-phase machine. However, it is obvious that any other number of energy supply branches can likewise be possible. The energy storage device 1 has an output connection 1a, 1b, 1c at each energy supply branch, said output connections being connected in each case to phase lines 2a, 2b, and 2c, which couple the energy storage device 1 to an electric machine 2. By way of example, the system 100 in FIG. 1 is used to feed an electric machine 2. However, provision can also be made for the energy storage device 1 to be used to generate electric current for an energy supply grid 2.

The system 100 can also comprise a control device 6, which is connected to the energy storage device 1 and by means of which the energy storage device 1 can be controlled in order to provide the desired output voltages at the respective output connections 1a, 1b, 1c.

The energy supply branches Z1, Z2 and Z3 can be connected at the ends thereof to a reference potential (reference rail). This can conduct an average potential with respect to the phase lines 2a, 2b, 2c of the electric machine 2 and can be connected to ground, for example. Each of the energy supply branches Z1, Z2 and Z3 has at least two series-connected energy storage modules 3. By way of example, the number of energy storage modules 3 per energy supply branch in FIG. 1 is three, any other number of energy storage modules 3 likewise being possible, however. In this case, each of the energy supply branches Z1, Z2, Z3 preferably comprises the same number of energy storage modules 3, it also being possible, however, to provide a different number of energy storage modules 3 for each energy supply branch Z1, Z2 and Z3.

The energy storage modules 3 in each case have two output connections 3a and 3b, via which an output voltage of the energy storage modules 3 can be provided.

Figure 2:
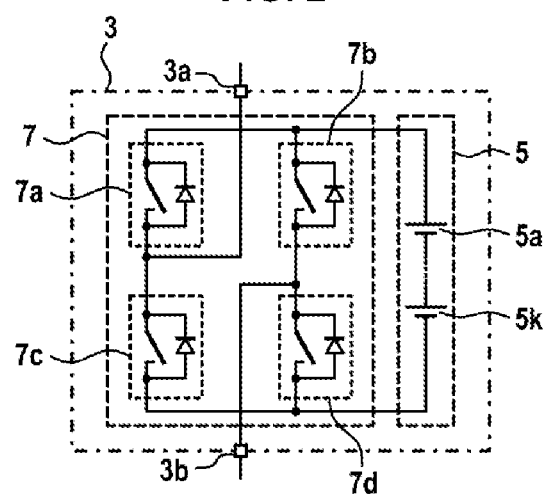
FIG. 2 shows a schematic illustration of an exemplary embodiment of an energy storage module of an energy storage device according to FIG. 1.
Figure 3:
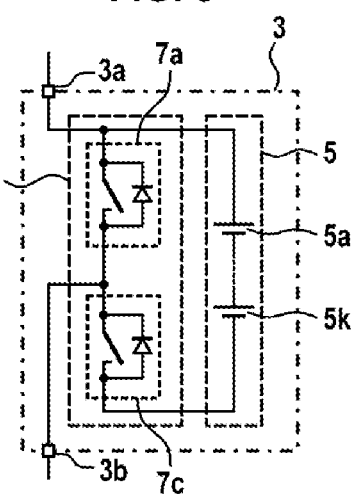
FIG. 3 shows a schematic illustration of another exemplary embodiment of an energy storage module of an energy storage device according to FIG. 1.

Exemplary design forms of the energy storage modules 3 are shown in more detail in FIGS. 2 and 3. The energy storage modules 3 in each case comprise a coupling device 7 with a plurality of coupling elements 7a and 7c and, optionally, 7b and 7d. The energy storage modules 3 also in each case comprise an energy storage cell module 5 with one or more series-connected energy storage cells 5a, 5k.

In this case, the energy storage cell module 5 can have, for example, series-connected batteries 5a to 5k, for example lithium-ion batteries or rechargeable batteries. In this case, the number of energy storage cells 5a to 5k in the energy storage module 3 shown by way of example in FIG. 2 is two, wherein any other number of energy storage cells 5a to 5k is likewise possible, however.

The energy storage cell modules 5 are connected to input connections of the associated coupling device 7 via connection lines. In FIG. 2, the coupling device 7 is designed by way of example as a full-bridge circuit with in each case two coupling elements 7a, 7c and two coupling elements 7b, 7d. The coupling elements 7a, 7b, 7c, 7d can in this case have an active switching element, for example a semiconductor switch, and a freewheeling diode connected in parallel therewith. The semiconductor switches can have, for example, field-effect transistors (FETs). In this case, the freewheeling diodes can also be integrated in each case into the semiconductor switches.

The coupling elements 7a, 7b, 7c, 7d in FIG. 2 can be actuated, for example by means of the control device 6 in FIG. 1, such that the energy storage cell module 5 is selectively switched between the output connections 3a and 3b or such that the energy storage cell module 5 is bypassed. By way of example, the energy storage cell module 5 can be switched between the output connections 3a and 3b in the forward direction, by the coupling element 7d on the bottom right and the coupling element 7a on the top left being transferred into a closed state while the two remaining coupling elements are transferred into an open state. Thus, a bypass state can be set, for example, by the two coupling elements 7a and 7b being transferred into a closed state while the two coupling elements 7c and 7d are kept in an open state.

By suitable actuation of the coupling devices 7, individual energy storage cell modules 5 of the energy storage modules 3 can therefore be integrated into the series circuit of an energy supply branch Z1 to Z3 in a targeted manner.

FIG. 3 shows another exemplary embodiment of an energy storage module 3. The energy storage module 3 shown in FIG. 3 differs from the energy storage module 3 shown in FIG. 2 merely in that the coupling device 7 has two instead of four coupling elements which are interconnected in a half-bridge circuit instead of a full-bridge circuit.

In the illustrated variant embodiments, the active switching elements can be embodied as power semiconductor switches, for example in the form of IGBTs (insulated-gate bipolar transistors), JFETs (junction field-effect transistors) or as MOSFETs (metal oxide semiconductor field-effect transistors).

By means of the coupling elements 7a, 7b, 7c, 7d, the output voltage of each of the energy supply branches Z1 to Z3 can be varied, by virtue of appropriate actuation in a stepped manner, from a maximum negative value up to a maximum positive value. The graduation of the voltage level emerges here on the basis of the stepping of the individual energy storage cell modules 5. In order to obtain, for example, an average voltage value between two voltage steps which are predefined by the stepping of the energy storage cell modules 5, the coupling elements 7a, 7b, 7c, 7d of an energy storage module 3 can be actuated in a clocked manner, for example in pulse-width modulation (PWM), with the result that the energy storage module 3 in question supplies, on average over time, a module voltage which can have a value between zero and the maximum possible module voltage which is determined by the energy storage cells 5a to 5k. In this case, by way of example, a control device, such as the control device 6 in FIG. 1, can actuate the coupling elements 7a, 7b, 7c, 7d, said control device for example being configured to perform current regulation with secondary voltage regulation, with the result that individual energy storage modules 3 can be connected or disconnected in a stepped manner.

By virtue of the use of an energy storage device 1 of this type, it is possible to provide an n-phase supply voltage, for example for an electric machine 2. For this purpose, phase lines 2*a*, 2*b*, 2*c* can be connected to the respective output connections 1*a*, 1*b*, 1*c*, wherein the phase lines 2*a*, 2*b*, 2*c* for their part can be connected to phase connections of the electric machine 2. By way of example, the electric machine 2 can be a three-phase electric machine which has internal inductances 2*d* of the machine 2.

The internal resistance of the energy storage cells 5*a* to 5*k* is dependent on temperature: in the case of lithium-ion rechargeable batteries, at a temperature of −10° C., the internal resistance can be increased up to ten times compared with the internal resistance at a temperature of +25° C. As a result, the effectiveness of the energy storage cells 5*a* to 5*k* can markedly decrease. In particular for situations in electric drive systems, in which high currents are required, for example starting situations of electrically driven vehicles, it is desirable, owing to the high current loading, to use energy storage cells 5*a* to 5*k* with a low internal resistance to supply the electric machine 2.

In order to avoid elaborate, costly, bulky and/or heavy heating elements or heaters having to be provided for the energy storage cells 5*a* to 5*k*, use can be made of the circumstance that, in the event of a transfer of electrical energy from one energy storage module 3 of an energy supply branch into an energy storage module 3 of another energy supply branch, a power loss in the form of heat loss occurs owing to the current loading. Said heat loss can then be used to locally and temporarily heat the energy storage modules 3 in question. Additional heating components are no longer necessary for this type of heating, since merely one specific actuation strategy for the coupling devices 7 must be selected in order to transfer electrical energy back and forth between two energy storage modules 3.

In this case, it should be noted that as part of the energy transfer processes, no undesired torque is generated in the electric machine 2. Preferably, the transfer of electrical energy can only take place during short time windows, that is to say that only high-frequency alternating currents are used for the transfer between the energy storage modules 3, the frequency of said high-frequency alternating currents is above a definable frequency limit. Additionally or as an alternative, a transmission pawl can also be activated in the event of the electric machine 2 being at a standstill, in order to prevent undesired movements in the electric machine 2 and hence in the electrically driven vehicle. The energy storage cells 5*a* to 5*k* can in this way be heated during usual operation of the system 100, too, by virtue of a high-frequency charge-redistribution current being superposed on the low-frequency operating current.

Figure 4:
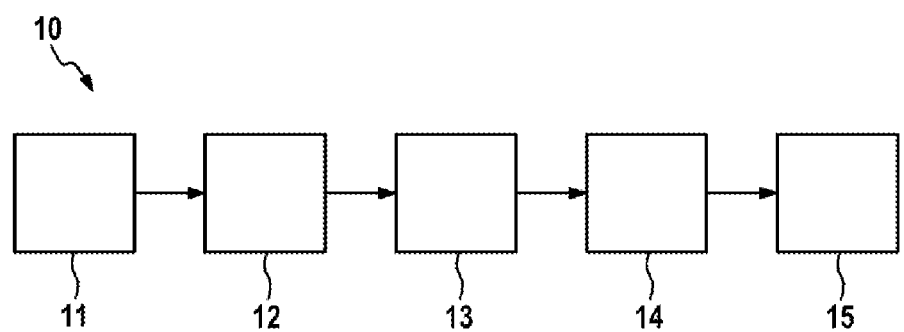
FIG. 4 shows a schematic illustration of a method for heating energy storage cells of an energy storage device in a system according to another embodiment of the present disclosure.

FIG. 4 shows a schematic illustration of a method 10 for heating energy storage cells of an energy storage device, for example of energy storage cells 5*a* to 5*k* of the energy storage device 1 in FIG. 1. The method 10 is particularly suitable for use in electrically driven vehicles which have an electric motor as electric machine 2. By way of example, energy storage devices 1 with energy storage cells 5*a* to 5*k* used in vehicles such as this are exposed to low temperatures during winter or at night, with the result that the method 10 speeds up and facilitates starting of the electrically driven vehicle. By virtue of the high-frequency redistribution of energy between the energy storage cells of the energy storage device 1, the energy storage cells in question can be heated by the charging power losses occurring in this case, with the result that the internal resistance of said energy storage cells decreases and the effectiveness thereof is thus increased. In this case, the method 10 can preferably be performed if the temperature of the energy storage cells falls below a first predetermined limit value. Said first predetermined limit value can be, for example, oriented toward a temperature below which the internal resistance of the energy storage cells of the energy storage device 1 exceeds a maximum permissible or desired value.

The method 10 can comprise, as first step 11, connecting the output connections 1*a*, 1*b*, 1*c* of the energy storage device 1 to input connections of an n-phase electric machine 2 and coupling the output connections 1*a*, 1*b*, 1*c* via the neutral point of the electric machine 2. In conventional electric drive systems with a three-phase machine 2, this is already the case anyway. Subsequently, in a second step 12, the coupling devices 7 of at least one energy storage module 3 of a first energy supply branch Z1 to Z3 can be actuated 12 to switch the respective energy storage cell modules 5 into the first energy supply branch Z1 to Z3. If, in a step 13, the coupling devices 7 of at least one energy storage module 3 of a second energy supply branch Z1 to Z3 are simultaneously actuated to switch the respective energy storage cell modules 5 into the second energy supply branch Z1 to Z3, a circuit exists through the respective energy storage modules 3 of the first energy supply branch Z1 to Z3, the electric machine 2, the neutral point of the electric machine, back into the energy storage device 1 through the respective energy storage modules 3 of the second energy supply branch Z1 to Z3 and the reference potential rail 4 to the first energy supply branch Z1 to Z3.

This state can be maintained for a first predetermined time period, with the result that electrical energy can be transferred from the respective energy storage modules 3 of the first energy supply branch Z1 to Z3 into the respective energy storage modules 3 of the second energy supply branch Z1 to Z3. If the first predetermined time period is selected such that it is shorter than the quotient of the inductance and nonreactive resistance of the inductive components 2*d* of the electric machine 2, the inductive components 2*d* of the electric machine 2 serve as a sort of intermediate store for the electrical energy taken from the first energy supply branch Z1 to Z3. After the first predetermined time period has elapsed, in a step 14, the coupling devices 7 of the at least one energy storage module 3 of the second energy supply branch Z1 to Z3 should be actuated to bypass the respective energy storage cell modules 5 in the second energy supply branch Z1 to Z3 for a second predetermined time period. As a result, the inductive components 2*d* of the electric machine 2 can be charged up again. The second predetermined time period can also be sufficiently short such that no undesired torques occur in the electric machine 2.

In this case, steps 13 and 14 can be alternated until the temperature of the energy storage cells 5*a*, 5*k* of the energy storage modules 3 in question exceeds a second predetermined limit value. Said second predetermined limit value can, for example, be oriented toward a temperature above which the internal resistance of the energy storage cells 5*a*, 5*k* of the energy storage device 1 falls below a desired value.

In a step 15, the at least one energy storage module 3 of the first energy supply branch Z1 to Z3 and the at least one energy storage module 3 of the second energy supply branch Z1 to Z3 can be selected to provide the n-phase supply voltage for the electric machine 2. In particular, in an operating situation which only requires a low input voltage for the electric machine 2, for example starting an electric vehicle, those energy storage modules 3 which have already been heated can be selected in a targeted manner in order to provide the n-phase supply voltage for the electric machine 2. The remaining energy storage modules 3 are then only connected at a later operating stage, for example if said energy storage modules 3 have been heated later, either by heating using the method 10 or automatic heating during driving operation of the electrically driven vehicle.

The invention claimed is:

1. A method for heating energy storage cells of an energy storage device configured to generate an n-phase supply voltage, wherein n≥1, the energy storage device including n parallel-connected energy supply branches each coupled between an output connection and a reference potential rail, wherein each of the energy supply branches includes a multiplicity of series-connected energy storage modules, each energy storage module including (i) an energy storage cell module having at least one energy storage cell, and (ii) a coupling device having coupling elements configured to selectively switch the energy storage cell module into a respective energy supply branch or to bypass the respective energy supply branch, the method comprising:

connecting the output connections of the energy storage device to input connections of an n-phase electric machine and coupling the output connections via a neutral point of the electric machine; and actuating the coupling devices of at least one energy storage module of a first energy supply branch to switch respective energy storage cell modules into the first energy supply branch, and simultaneously, actuating the coupling devices of at least one energy storage module of a second energy supply branch to switch respective energy storage cell modules into the second energy supply branch for a first predetermined time period.

2. The method as claimed in claim 1, further comprising:

actuating the coupling devices of the at least one energy storage module of the second energy supply branch to bypass the respective energy storage cell modules in the second energy supply branch for a second predetermined time period, after the first predetermined time period has elapsed.

3. The method as claimed in claim 1, wherein the first predetermined time period is shorter than a quotient of an inductance and a nonreactive resistance of the inductive components of the electric machine.

4. The method as claimed in claim 1, further comprising:

selecting the at least one energy storage module of the first energy supply branch and the at least one energy storage module of the second energy supply branch to provide the n-phase supply voltage for the electric machine.

5. The method as claimed in claim 2, wherein the method is performed if a temperature of the energy storage cells falls below a first predetermined limit value.

6. The method as claimed in claim 5, wherein the actuating the coupling devices of the at least one energy storage module of the second energy supply branch to switch the respective energy storage cell modules into the second energy supply branch and the actuating the coupling devices of the at least one energy storage module of the second energy supply branch to bypass the respective energy storage cell modules in the second energy supply branch are alternated until a temperature of energy storage cells of at least one energy storage module in question exceeds a second predetermined limit value.

7. A system, comprising:

an n-phase electric machine, wherein n≥1;

an energy storage device configured to generate an n-phase supply voltage, the energy storage device including n parallel-connected energy supply branches each coupled between an output connection and a reference potential rail, each of the energy supply branches including a multiplicity of series-connected energy storage modules, each energy storage module including (i) an energy storage cell module having at least one energy storage cell, and (ii) a coupling device having coupling elements configured to selectively switch the energy storage cell module into a respective energy supply branch or to bypass the respective energy supply branch;

n phase lines each configured to couple one of the output connections of the energy storage device to one of n phase connections of the n-phase electric machine; and a control device is configured to perform a method for heating the energy storage cells of the energy storage device including connecting the output connections of the energy storage device to input connections of the n-phase electric machine and coupling the output connections via a neutral point of the electric machine, and actuating the coupling devices of at least one energy storage module of a first energy supply branch to switch respective energy storage cell modules into the first energy supply branch, and simultaneously actuating the coupling devices of at least one energy storage module of a second energy supply branch to switch respective energy storage cell modules into the second energy supply branch for a first predetermined time period.

8. The system as claimed in claim 7, wherein the coupling devices comprise coupling elements in a full-bridge circuit.

9. The system as claimed in claim 7, wherein the coupling devices comprise coupling elements in a half-bridge circuit.

10. The system as claimed in claim 7, wherein the energy storage cells comprise lithium-ion rechargeable batteries.

* * * * *